United States Patent Office 3,012,905
Patented Dec. 12, 1961

3,012,905
PROCESS OF REDUCING STATIC ELECTRICITY IN POLYAMIDE FIBERS AND THE LIKE PRODUCTS
Henry Tillisch, Kastelsvej 4, Copenhagen, Denmark
No Drawing. Filed Sept. 25, 1957, Ser. No. 686,047
Claims priority, application Denmark Sept. 29, 1956
12 Claims. (Cl. 117—106)

This invention relates to a process of reducing the tendency of polyamide fibers and molded articles to become electric by friction, i.e. to so-called static eliminators.

In principle, the present invention consists in treating polyamide molded bodies and especially polyamide filaments, fibers, threads, films, and other products made of polyamides, with an agent containing in its molecule at least one reactive group able to combine with at least one of the reactive groups (=NH and =O) of the polyamides, and containing or forming hydrophilic groups such as —OH and —COOH. Only the outer layers of the polyamide products will react with the above mentioned agent, while the inner layers are protected by the outer layers of the relatively long $CH_2$-chains of the polyamides, these $CH_2$-chains being very resistant to chemical reactions. The inner layers, thus, retain their characteristic properties substantially without any change.

Especially suitable agents according to the present invention are mono- or poly-aldehyde with at least two carbon atoms, aldehyde carboxylic acids (aldo acids), hydrins, nitriles, organic or inorganic tanning materials, $\beta$-propiolactone, and the like compounds such as glyoxal, aldehyde alcohols, like glycol aldehyde, aldo-trioses, aldo-pentoses, aldo-hexoses, acetaldol, formic acid, glyoxylic acid, glucuronic acid, chlorohydrins, acrylonitrile, tanning materials, such as tannic acid, extracts of oak bark and chromium compounds and the like which are mentioned as examples of such agents which reduce static electricity of polyamide products.

According to the present invention, the polyamide products are treated at a suitable temperature which may range, for instance, from room temperature or even a lower temperature up almost to the melting point of the polyamide concerned depending upon the static eliminator employed and its reactivity. Temperatures between about 15° C. and about 200° C. and preferably between about 80° C. and about 100° C. may be employed. If the temperature is not too high, the filaments, fibers, threads, films, and the like products will not become discolored, but the treatment will require more time than when proceeding at a higher temperature.

The treatment at room temperature must be prolonged, in some cases, up to several days, while, for instance, at 200° C. only a short period of time produces the desired effect.

The polyamide products may be treated with the agents dissolved and/or diluted in a suitable solvent and/or diluent. If the agent can be evaporated, the polyamide products may preferably be exposed to the vapors of said static eliminators. Such a vapor treatment is especially mild and, therefore, does not adversely affect the polyamide.

When carrying out the treatment in a solvent and/or diluent, it is advisable to add a moistening or wetting agent to the liquid, such as pyridine, phosphoric acid, benzyl alcohol, water soluble aliphatic alcohols, phenols. Such moistening or wetting agents facilitate reaction between the polyamide product and the static eliminator.

According to another embodiment of the present invention the properties of the polyamide products treated according to the present invention are improved considerably by thoroughly washing such treated products in a slightly alkaline solution at elevated temperature above 40° C., preferably between 70° C. and 100° C. Especially suitable has proved washing with a warm soap solution.

The static eliminating or static reducing effect of the static eliminating agents according to the present invention is frequently enhanced when drying the polyamide products—possibly after alkaline washing—at a temperature exceeding about 40° C., preferably at a temperature of 70–80° C., or even—if the polyamide product can support it—at temperatures up to the softening point of these products, and exposing the dried products to such a temperature for a prolonged period of time.

Furthermore, it was found that certain static eliminators require an aging treatment in order to develop their advantageous effects. In some instances a satisfactory effect was achieved by storing the treated material for several weeks while other materials do not require such an aging treatment.

The following examples serve to illustrate the present invention without, however, limiting the same thereto.

EXAMPLE 1

Polyamide filaments are placed above an aqueous solution containing 5% formic acid at room temperature in a closed container. After a period of about seven days the filaments are washed in distilled water and dried at room temperature. When rubbing the dried filaments between the fingers, no static electricity is generated at a relative humidity of 58% to 65% (wet bulb method).

It may be mentioned here that the method of determining static electricity by rubbing between the fingers the filaments in the untreated or treated state is a very simple and quick method of determining the effectiveness of a static eliminator and is not as time consuming as the method of measuring the conductivity of the filament by means of an electrometer. Furthermore, the first mentioned method imitates rather well the rubbing to which fabrics containing polyamide products are exposed in wear. Finally, by the said "finger" method the treated polyamide cannot only easily be compared with the corresponding untreated material, but also with e.g. cotton and wool. If the tribo-electrification of the treated polyamide compares well with the tribo-electrification of cotton or wool, the effect of the treatment may be regarded as satisfactory.

EXAMPLE 2

Polyamide filaments are placed above an aqueous solution containing 75% formic acid at room temperature in a closed container. After a period of 2 days the filaments are washed and dried. When rubbing the dried filaments between the fingers, no static electricity is generated at a relative humidity of 58% to 65%.

EXAMPLE 3

Polyamide filaments are exposed to the vapors of formic acid generated by heating an aqueous 5% formic acid solution at 100° C. for about 20 minutes in a reaction chamber. No static electricity is detected after washing and drying of the treated filaments.

EXAMPLE 4

Polyamide filaments are immersed in an aqueous 5% formic acid solution and are kept therein at room temperature for 4 days. The filaments are then washed and dried. When rubbing the dried filaments between the fingers, no static electricity is generated at a relative humidity of 58% to 65%.

EXAMPLE 5

Polyamide filaments are immersed in an aqueous 50% formic acid solution and are kept therein at room temperature for 2 days. The treated filaments are washed and dried. When rubbing the dried filaments between the fingers, no static electricity is generated at a relative humidity of 58% to 65%.

EXAMPLE 6

Polyamide filaments are immersed in an aqueous solution containing 5% glyoxal and the solution is heated to 90° C. for 80 minutes. The washed and dried filaments do not show any static electricity.

EXAMPLE 7

Polyamide filaments are exposed at a temperature of 150° C. to the action of vapors of glyoxal produced by heating a 1% glyoxal solution in a reaction chamber immersed in an oil bath and having a reflux condenser, in which the filaments are arranged above said glyoxal solution. After an exposure for 10 minutes the treated filaments are washed and dried. They are free of tribo-electrification.

EXAMPLE 8

Polyamide filaments are treated with formic acid as described hereinabove in Examples 1 to 5. The treated filaments are then immersed in an aqueous 1% soap solution and are heated therein to boiling for 4 hours to 16 hours. In most instances, the static eliminating effect of formic acid is improved and the soap-treated filaments can be heated in air at 80° C. for 4 hours without any increase in tribo-electrification.

EXAMPLE 9

Polyamide filaments are treated with glyoxal as described hereinabove in Examples 6 and 7. The treated filaments are heated at 80° C. in an aqueous 1% soap solution for about 6 hours. In many instances the static eliminating effect of the glyoxal treatment is improved.

EXAMPLE 10

Polyamide filaments are immersed into an aqueous 5% 3-chloro-1,2-propanediol solution heated to 80° C. for about 4 hours. Substantially complete elimination of static electricity is achieved only by heating the treated filaments in an aqueous 1% soap solution at 80° C. for 4 hours.

EXAMPLE 11

Polyamide filaments are immersed into an aqueous 5% glucose solution heated to 80° C. for about 4 hours. Substantially complete elimination of static electricity is achieved only by heating the treated filaments in an aqueous 1% soap solution at 80° C. for 4 hours.

EXAMPLE 12

Polyamide filaments are immersed into an aqueous 5% tannic acid solution heated to 80° C. for about 4 hours. Substantially complete elimination of static electricity is achieved by heating the treated filaments in an aqueous 1% soap solution at 80° C. for 4 hours.

EXAMPLE 13

Polyamide filaments are immersed into an aqueous commercial oak bark extract heated to 80° C. for about 4 hours. Substantially complete elimination of static electricity is achieved only by heating the treated filaments in an aqueous 1% soap solution at 80° C. for 4 hours.

EXAMPLE 14

Polyamide filaments are immersed into an aqueous 5% acrylonitrile solution heated to 80° C. for about 4 hours. Substantially complete elimination of static electricity is achieved only by heating the treated filaments in an aqueous 1% soap solution at 80° C. for 4 hours.

EXAMPLE 15

Polyamide filaments are immersed into an aqueous 2% β-propiolactone solution heated to 80° C. for about 4 hours. Substantially complete elimination of static electricity is achieved only by heating the treated filaments in an aqueous 1% soap solution at 80° C. for 4 hours.

EXAMPLE 16

Polyamide filaments are immersed into a 2% solution of β-propiolactone in trichloro ethylene and are kept therein for about 10 hours. After drying, the treated filaments show less tribo-electrification than filaments treated with aqueous solutions of β-propiolactone. Substantially complete elimination of static electricity is also achieved by heating the treated filaments in a 1% soap solution at 80° C. for about 4 hours.

EXAMPLE 17

Polyamide filaments are immersed into an aqueous 5% glycol aldehyde solution heated at 85° C., which solution by the addition of ammonia is brought to a pH value of 9, for about 5 hours, whereafter they are washed with distilled water, heated in a 1% soap solution heated at 85° C. for 10 hours, washed with distilled water, heated in the air at 85° C. for 3 hours. The tribo-electricity of the polyamide filaments is essentially reduced.

Similar results are obtained when the glycol aldehyde is replaced by aldo trioze or glucuronic acid.

It has been found that not all the commercially available polyamide fibers can be successfully treated with all the static eliminating agents. A number of such polyamide filaments are more effectively treated, for instance, with formic acid, others with tannic acid, others with β-propiolactone, and so forth. It is, of course, quite easy to determine for each type of polyamide material the most suitable type of static eliminating agent. The following tables show, for instance, the static eliminating effect of various agents on 15 different types of polyamide filaments. The filaments were treated in exactly the same manner with the static eliminating agents, were then heated at 80° C. with 1% soap solution for 4 hours, and dried in air at 80° C. for 4 hours.

A in said table indicates that tribo-electrification is almost completely eliminated, while C indicates complete elimination of tribo-electrification.

No symbol indicates that the static eliminating agent did not act satisfactorily.

*Table 1*

| Static eliminating agent | 1 | 2 | 3 | 4 | 5 | 6 | 7 | 8 | 9 | 10 | 11 | 12 | 13 | 14 | 15 | pH |
|---|---|---|---|---|---|---|---|---|---|---|---|---|---|---|---|---|
| Formic acid | | | A | | | C | A | A | C | A | | A | | | C | 9 |
| Glyoxal | | | | | A | C | C | | C | | | A | A | A | C | 1 7 |
| 3-Chloro-1,2-propane diol | | | | A | A | C | | C | | | | | | | A | 9 |
| Glucose | | | | A | C | C | C | A | C | | | A | | | A | 9 |
| Tannic acid | A | A | | C | | C | A | C | C | C | A | C | C | C | C | 9 |
| β-Propiolactone in water | A | | | A | | A | A | | | | | | C | A | A | 9 |
| Glyoxylic acid | | | | A | C | A | | A | A | | | | | | C | 7/9 |
| β-Propiolactone in trichloro ethylene | A | A | | C | A | C | | A | A | | | | | A | C | |
| K₂Cr₂O₇+HCl | | | | | A | | A | A | | A | | | | A | A | |
| K₂Cr₂O₇+Glucose | | | | | A | A | A | | A | | | | | | A | |

¹ By addition of acetic acid.

While Table I given hereinabove lists the results obtained by keeping the filaments in a closed container at room temperature above the solution of the static eliminating agent for 7 days (formic acid) or by immersing the filaments into solutions of the static eliminating agent at about 80° C. for until 4 hours (the other agents mentioned in the table), it was found that some of the filaments require higher temperatures, namely up to 195° C. The following tables illustrate the results obtained at such higher temperatures:

Table II

| Static eliminating agent | Temp., °C., of bath | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Formic acid | 140-150 | C | C | C | C | A |   | A | C |   | C | A |   | A | A | C |
| Glyoxal | 140-150 | A | A | C | A |   |   |   | A | A | A | A | A | C | A | C |
| Acrylonitrile | 125-130 | C | A | A |   |   | C | C | C |   | A | A |   |   |   | C |
| Acetaldol | 125-130 | A |   |   |   | A | A |   | A | C | A |   |   | C | A | A |

Table III

| Static eliminating agent | Temp., °C., of bath | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Formic acid | 190-195 | A |   | A |   |   |   | C |   |   | A | C |   | A |   |   |
| Glyoxal | 190-195 | A |   | C |   |   |   |   |   |   | C | C |   | C |   |   |
| Acetaldol | 190-195 |   | C |   |   | A |   |   |   |   | C | A |   | C | A | A |
| Glucose molten | 145-160 |   |   |   |   |   |   |   | A |   | C | C | A |   |   | A |
| Acrylonitrile | 190-195 |   |   | C |   |   |   |   | A |   | A | C |   | A |   | A |

Table IV

| Static eliminating agent | Temp., °C., of bath | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 3-chloro-1,2-propane diol | 125-130 | C | A | C |   |   |   |   | A |   | C |   |   |   |   |   |
| Same | 190-195 |   |   | C | C | A | A | A | C |   |   |   |   |   |   |   |
| Same and ammonia | 180 | A | A | A | A | A | A | A |   |   | C | C |   |   |   | C |
| Same and pyridine | 190 | C |   |   | C | C | C | A | A | C | A | C |   |   | C | A |

Table II shows that a treatment of 15 minutes at bathtemperatures of 140–150° C. can give better results than those quoted in Table I.

Table III shows that a bathtemperature of 190–195° C. is too high for some of the filaments, while for others it can be suitable to use this temperature.

Table IV regards some special experiments with 3-chloro-1,2-propanediol. The two firstmentioned experiments show that for a series of filaments this agent gives good results with bathtemperatures of 125–130° C., whilst for another series good results are obtained at bathtemperatures of 190–195° C. Only the filaments 3 and 8 have given good results at both of these bathtemperatures.

In the two lastmentioned experiments of Table IV the filaments have been treated with 3 - chloro-1,2 - propanediol to which ammonia or pyridinium bases have been added.

Of course, many changes and variations in the static eliminating agents used, in the concentrations in which they are employed, in the solvents used for dissolving the same, in the manner of application of the agents to the polyamide material, whether in liquid form or in vapor form, in the temperature and duration of the treatment, in the manner in which the treated polyamide material is further worked up, in the alkaline agents used for improving the static eliminating action of such agents, and the like may be made by those skilled in the art in accordance with the principles set forth herein and in the claims annexed hereto.

I claim:

1. In a process of reducing static electricity in polyamide fibers, films, and the like molded products, the step which consists in exposing the polyamide product to the action of a static eliminating compound selected from the group consisting of hydroxy aldehydes, polyaldehydes, aldehydo carboxylic acids, hydrins, nitriles, organic tanning materials, and β-propiolactone, at a temperature and for a period of time sufficient to substantially reduce tribo-electrification of the polyamide product without substantially adversely affecting the properties of the treated polyamide product.

2. The process according to claim 1, wherein the polyamide product is exposed to the static eliminating compound at a temperature between about room temperature and about the softening temperature of the polyamide product.

3. The process according to claim 1, wherein the polyamide product is exposed to the action of a solution of the static eliminating agent.

4. The process according to claim 1, wherein the polyamide product is exposed to the action of vapors of the static eliminating agent.

5. In a process of reducing static electricity in polyamide fibers, films, and the like products, the step which consists in exposing the polyamide product at room temperature in a closed reaction chamber to the action of formic acid vapors for at least two days until tribo-electrification of the polyamide is substantially reduced.

6. In a process of reducing static electricity in polyamide fibers, films, and the like products, the step which consists in immersing the polyamide product at room temperature into an aqueous formic acid solution for at least two days until tribo-electrification of the polyamide is substantially reduced.

7. In a process of reducing static electricity in polyamide fibers, films, and the like products, the step which consists in exposing the polyamide product at about 200° C. to the action of formic acid vapors for about 20 minutes.

8. In a process of reducing static electricity in polyamide fibers, films, and the like products, the step which consists in immersing the polyamide product at a temperature of about 90° C. in an aqueous solution of glyoxal for about 80 minutes until tribo-electrification of the polyamide product is substantially reduced.

9. In a process of reducing static electricity in polyamide fibers, films, and the like products, the step which consists in exposing the polyamide product at a temperature of about 150° C. in a closed reaction chamber to the action of glyoxal vapors for about 10 minutes until tribo-electrification of the polyamide product is substantially reduced.

10. In a process of reducing static electricity in polyamide fibers, films, and the like products, the steps which consist in exposing the polyamide product at room temperature in a closed reaction chamber to the action of formic acid vapors for at least two days until tribo-electrification of the polyamide is substantially reduced, immersing the treated polyamide product in an aqueous soap solution, heating the soap solution to a temperature of at least 40° C. until no further reduction in tribo-electrification is achieved, washing the soap-treated polyamide product with water, and drying the washed polyamide product at a temperature of at least 40° C.

11. In a process of reducing static electricity in polyamide fibers, films, and the like products, the steps which consist in exposing the polyamide product at a temperature of about 150° C. in a closed reaction chamber to the action of glyoxal vapors for about 10 minutes until tribo-electrification of the polyamide product is substantially reduced, immersing the treated polyamide product in an aqueous soap solution, heating the soap solution to a temperature of at least 40° C. until no further reduction in tribo-electrification is achieved, washing the soap-treated polyamide product with water, and drying the washed polyamide product at a temperature of at least 40° C.

12. In a process of reducing static electricity in polyamide fibers, films, and the like products, the steps which consist in immersing the polyamide product at about 80° C. into an aqueous tannic acid solution for about 4 hours until tribo-electrification of the polyamide is substantially reduced, immersing the treated polyamide product in an aqueous soap solution, heating the soap solution to a temperature of at least 40° C. until no further reduction in tribo-electrification is achieved, washing the soap-treated polyamide product with water, and drying the washed polyamide product at a temperature of at least 40° C.

References Cited in the file of this patent

UNITED STATES PATENTS

| | | |
|---|---|---|
| 2,317,728 | Bristol | Apr. 27, 1943 |
| 2,343,090 | Smith | Feb. 29, 1944 |
| 2,729,577 | Bacon | Jan. 3, 1956 |
| 2,745,770 | Kingerley | May 15, 1956 |
| 2,808,346 | Lutgerhorst | Oct. 1, 1957 |
| 2,839,431 | Rimmer | June 17, 1958 |